Figure 1:
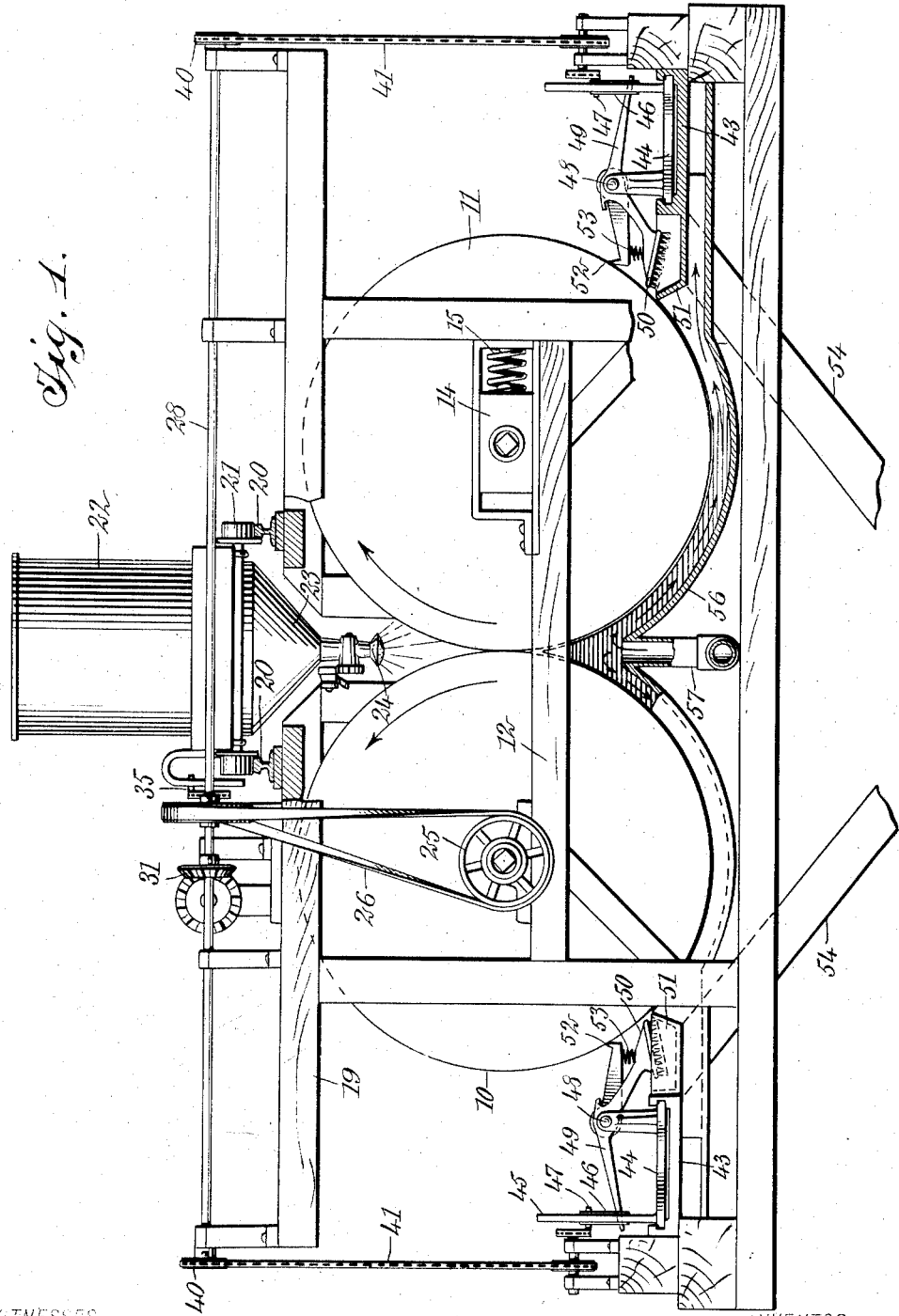

J. ROEH.
DESICCATING APPARATUS.
APPLICATION FILED AUG. 13, 1908.

927,169.

Patented July 6, 1909.
3 SHEETS—SHEET 1.

WITNESSES

INVENTOR
John Roeh
BY
ATTORNEYS

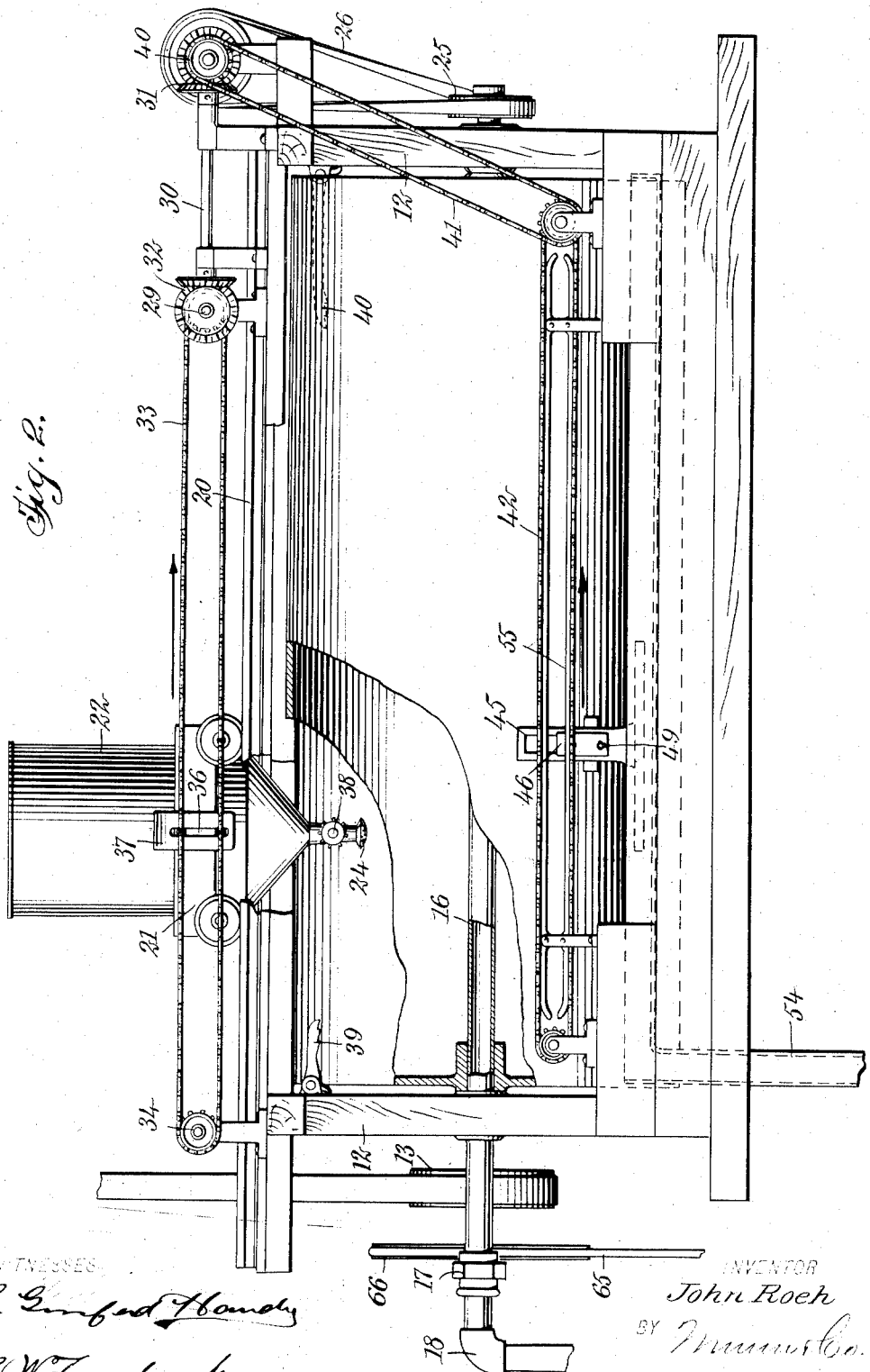

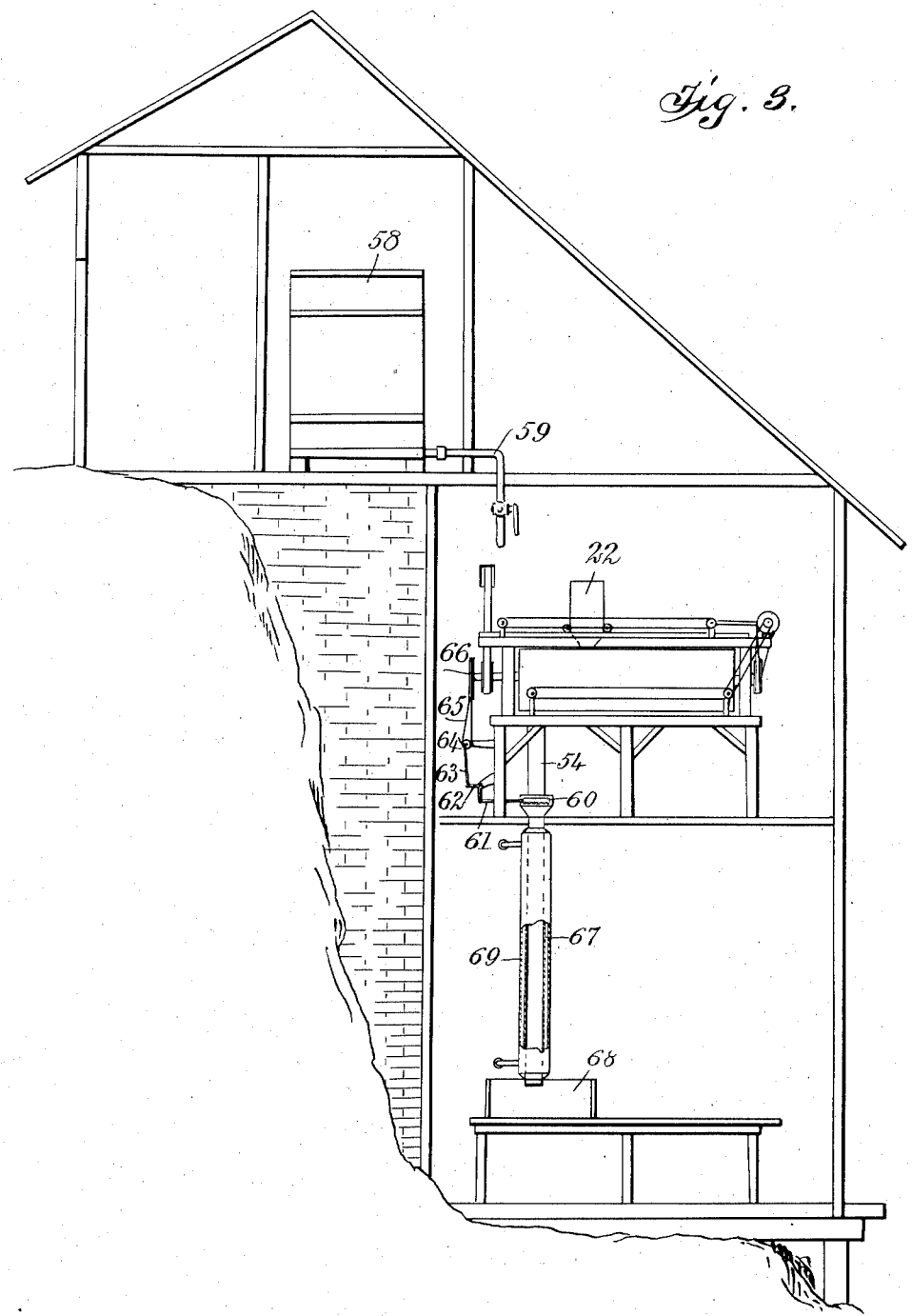

UNITED STATES PATENT OFFICE.

JOHN ROEH, OF SPOKANE, WASHINGTON, ASSIGNOR TO CRYSTALLIZED MILK CO., OF SPOKANE, WASHINGTON, A CORPORATION.

DESICCATING APPARATUS.

No. 927,169.  Specification of Letters Patent.  Patented July 6, 1909.

Application filed August 13, 1908. Serial No. 448,302.

*To all whom it may concern:*

Be it known that I, JOHN ROEH, a citizen of the United States, and a resident of Spokane, in the county of Spokane and State of Washington, have invented a new and Improved Desiccating Apparatus, of which the following is a full, clear, and exact description.

This invention relates to certain improvements in desiccating apparatus, and more particularly to an apparatus especially designed for use in the treatment of milk to remove the water therefrom and produce a powdered product.

By means of my improved apparatus, I obtain a milk product in a light finely subdivided powdered form containing all of the solids including the fatty substances of the milk, in such a condition that they are freely soluble in water to produce a milk similar in all respects to fresh milk, and without necessitating the adding of any foreign substance whatever thereto either before or after the drying or dehydrating action. To secure this product, I take the raw milk in its natural state and spread or spray it very thinly on glass or enameled plates or cylinders, or other hard surfaces, heated to a temperature ranging from 110 to 150 degrees Fahrenheit, and deliver a current of warm air against the thin film of the milk. The milk is evaporated to dryness almost instantaneously and is transformed into a hard coating, which when scraped from the surface produces a white fluffy powder. This powder is immediately removed, passed through a fine mesh screen, heated to such a temperature as will thoroughly sterilize the same, and is then packed at once in airtight receptacles previously sterilized. The milk is not heated to sufficiently high temperature to cause any chemical change in the caseins, proteids, or other solid constituents, but is spread out in such a thin film that in the presence of the current of warm air and the action of the heated surface, the water is removed and the solids reduced to a state of complete dryness.

In order that the milk may be thoroughly and completely dried before removing the same from the heated surface, I so construct the apparatus that the film may remain on the rotating cylinder or drum during a plurality of revolutions of the latter. The drum or drums and the milk delivery nozzle are preferably so mounted in relation to each other, that the nozzle travels longitudinally of the drum and delivers milk thereto while traveling in one direction, but is closed while traveling in the opposite direction, the nozzle while delivering milk being preceded by a scraper which removes from the surface of the drum, the dried material resulting from the previous delivery trip of the nozzle. Thus, the milk delivered at any one point upon the surface of the cylinder remains to be thoroughly dried while the nozzle completes this milk-delivering trip, returns to the starting point, and nearly reaches a given point upon the next succeeding milk delivering trip, during which time the cylinder has rotated through a plurality of revolutions, the milk has repeatedly come in contact with the current of warm air, and the drums have compressed the film to crush all hard particles and form a coating of uniform thickness. The milk scraped from the drums is delivered to a receiving trough extending substantially the length of the drums, and in order to prevent the accumulation of the dried powder within the trough, the apparatus is so constructed as to transfer all of the material to one end of the trough during the return or non-operating movement of the scraper and delivering nozzle.

My improved apparatus may be used for carrying out the process disclosed in my divisional application, Serial No. 472,431, filed January 15, 1909.

I will now describe the details of one from of my improved apparatus, reference being had to the accompanying drawings forming a part of this specification, in which similar characters of reference indicate corresponding parts in all the figures, and in which—

Figure 1 is an end view of my improved apparatus; Fig. 2 is a side view thereof, a portion being broken away; and Fig. 3 is a side elevation showing somewhat diagrammatically, mechanism constructed and arranged in accordance with my invention.

In carrying out my invention, I preferably employ the apparatus illustrated in detail in Figs. 1 and 2. This apparatus comprises a suitable framework having two drums mounted to rotate on horizontal axes, and having means for spraying onto the drums the milk or other material to be desiccated, and having means for removing the resulting product. In the preferred form of my apparatus, I provide two hollow drums 10 and 11 mounted in suitable journals in opposite end frames 12 and engaging with each other throughout their length. One of the journals of one drum preferably extends beyond the end frame and is provided with a suitable pulley 13, whereby the drum may be rotated from any suitable source of power, and the journal boxes 14 of one of the drums is slidably mounted with the frame, whereby the two drums may be held resiliently in engagement with each other by the action of coil springs 15 in engagement with said sliding journal boxes. The drums may be heated internally in any suitable manner, as, for instance, by means of electricity, steam or hot water. As illustrated, the supporting shaft 16 of each drum is hollow and the outer end thereof is connected through a universal joint 17 to a steam or hot water supply pipe 18.

The specific details of the heating mechanism comprises no portion of my invention.

The opposite end frames 12 serve to support an upper horizontally disposed frame or platform 19, and upon this platform are mounted rails 20 forming a track along which runs a small truck 21 carrying a receptacle 22 for the milk or other liquid to be delivered upon the surfaces of the drums. This receptacle terminates in a conical bottom 23 having a spray nozzle 24 located between the two drums and as near as possible to the line along which the two drums engage with each other. The spraying nozzle 24 is of such a size and so located in respect to the drums, that it can only deliver to a small portion of the surfaces of the drums at any one time, but by moving the truck and receptacle along the track and longitudinally of the drums, all portions of the surfaces of the drums may be reached by the spraying nozzle. For moving the truck, receptacle and nozzle at a uniform speed in respect to the speed of rotation of the drums, I provide the end shaft of one of the drums with a small pulley 25, which by means of a belt 26 transmits motion to a transverse shaft 28 journaled above the platform 19. Motion is transmitted from the shaft 28 to a short counter-shaft 29 supported parallel thereto in any suitable manner, as, for instance, by a shaft 30 and bevel gear wheels 31 and 32. The counter-shaft 29 is provided with a sprocket wheel over which travels a chain 33. Upon the platform and adjacent the opposite end of the drums is a sprocket wheel 34 over which the chain 33 also passes. The chain lies parallel to and adjacent one of the rails 20 of the track, and means are provided whereby the motion of the chain causes a movement of the truck along the track. As shown, one of the links of the chain 33 is provided with a lug or projection 35 extending through a vertically disposed slot 36 in a plate 37 carried by the truck. In order to support the plate outside of the side wheels of the truck, it is preferably of inverted U-shaped form, as illustrated in Fig. 1. As the drums rotate, the motion is transmitted through the pulley 25 and belt 26 to the upper shaft 28, and from this shaft to the chain 33. As the chain moves the lug or projection 35 upon one link extending through the slot 36, causes the plate 37 and truck 21 to move along the track until the plate reaches one of the sprocket wheels, at which time the lug passes vertically through the slot to the opposite end thereof, and upon the return movement of the portion of the chain carrying the lug or projection, the truck is moved in the opposite direction to the other sprocket wheel. Thus the tank 22 is moved back and forth longitudinally of the rotating drums and at a uniform speed in respect thereto.

In order to secure the objects hereinafter more clearly set forth, I provide means for automatically shutting off the supply of fluid to the spraying nozzle 24 while the receptacle is traveling in one direction, and automatically opening the valve to permit a flow of fluid to the nozzle while the receptacle is traveling in the opposite direction. This means includes a valve 38 adjacent the nozzle 24, and having a valve stem or handle provided with radially extending projections. Carried by the frame and adjacent each end thereof are provided pivotally mounted pawls 39 and 40 having teeth upon the lower surfaces thereof. These are so mounted in respect to the nozzle, that when the tank reaches one end of the drum, one of the pawls engages with the projections upon the upper surface of the valve stem and rotates the same to shut off the supply, while due to the pivotal supporting of the pawl the valve may move out of engagement with the pawl without again opening the valve. When the valve reaches the opposite end of the drum, the other pawl engages with the upper surface of the valve stem and rotates the valve to open the same. In this manner the nozzle sprays liquid upon the surfaces of the drums only while traveling in one direction, the valve being closed upon the return movement.

For removing the dried or desiccated material from the surfaces of the drums, I provide scrapers adapted to engage with said surfaces and also adapted to travel longitudinally of the drums simultaneously with the delivery tank and spraying nozzle. The scrapers for the two drums are exactly alike, and a description of one of them will suffice for the other. The shaft 28 mounted upon the platform 19 supports a sprocket wheel 40 at each end thereof, and extending downward from said sprocket wheels are the chains 41 serving to operate the scrapers.

Suitably mounted adjacent each end of each drum adjacent the outer side at the lower portion thereof, is a chain 42 mounted upon suitable sprocket wheels, one of which is positively driven by means of the chain 41. The sprocket wheels upon which these chains are mounted, are of substantially the same distance apart as are the sprocket wheels upon which the chain 33 is mounted, and this chain serves to move a suitable scraper longitudinally of the drum and slightly in advance of the spraying nozzle during the delivery trip thereof.

Corresponding to the rails 20 forming the track for the delivering receptacle and its truck, I provide a suitable support 43 forming a guideway for a longitudinally movable plate 44. This plate is provided with a vertically disposed extension 45 at one side thereof, which extension is provided with a vertical slot having a small plate 46 mounted to reciprocate therein. This plate is provided with an opening adapted to receive a projection or lug 47 carried by one of the links of the chain 42, whereby as the chain moves the plate 44 is caused to move therewith until the lug or projection on the chain passes the sprocket wheel, at which time the plate 46 moves to the opposite end of its slot and the plate 44 is moved in the opposite direction along its guideway. At the opposite side of the plate 44 from the extension 45 there is provided a suitable standard 48 upon which is pivotally mounted an arm 49, one end of which extends through the opening in the plate 46, and the other end of which supports a brush 50 mounted adjacent the receiving trough 51. Also pivotally mounted upon the standard 48 is a scraper 52 adapted to engage with the surface of the drum and resiliently supported in relation thereto by means of a coil spring 53 engaging with the back of the brush and the under side of the scraper. The trough 51 extends substantially the entire length of the drum, and at one end thereof is provided with a conduit 54 through which the desiccated material is delivered.

In the operation of this portion of my apparatus, the plate 46 in traveling from one sprocket wheel to the other, may be at either the lower or upper position, depending upon the longitudinal direction in which the operating link is traveling. With the plate in the position indicated in Figs. 1 and 2, the end of the arm 49 in extending through the opening in the plate 46 holds the brush 50 out of the trough, and the scraper is held resiliently in engagement with the surface of the drum. When the scraper reaches a point adjacent the end of the drum and the plate 46 is moved to the upper position, the brush 50 is lowered into engagement with the bottom of the trough and the scraper 52 is moved out of engagement with the surface of the drum. Thus, during one movement of the carrying plate 44 the material is scraped from the surface of the drum into the trough, and upon the return movement of said plate the material scraped from the drum is brushed along the trough to one end thereof and delivered through the conduit 54. In order that the scraper may engage with the surface of the drum with uniform pressure throughout the length thereof, and in order that the brush may engage with the bottom of the trough with uniform pressure any suitable means, as, for instance, guides 55, may be provided adjacent the chain 42 between the two sprockets, to prevent the chain from sagging. The scraper is so mounted in respect to the distributing nozzle 24 that during the time while the nozzle is delivering liquid into engagement with the surface of the drum, the scraper is traveling slightly in advance of the sprayer and is scraping off that portion of the material which was delivered to the drum upon the previous spraying trip of the nozzle. When the scraper and nozzle reach the end of their respective courses, both are thrown out of operation and return to the opposite end of the drum, during which time the material upon the surface of the drum is thoroughly dried and hardened by the heating action, and rendered uniform in thickness by the crushing action between the two drums.

To facilitate the drying action caused by the internally heated drums, I provide a casing 56 below the drums and having portions terminating closely adjacent the drums at each end thereof. The casing is spaced at a uniform distance from the surfaces of the drums, and at a point directly beneath the meeting line of the two drums there is provided a conduit 57 serving to deliver warm air into engagement therewith. The air passes upward into engagement with the lower surfaces of the drums and then flows downward and outward adjacent the under surfaces thereof, as is indicated by the arrows. The exhaust air preferably passes in engagement with the under surfaces of the troughs to maintain them at the desired temperature.

In employing the apparatus above described for the desiccating of milk, the raw milk in its natural state is delivered from the tank 58 in a refrigerating room through a suitable conduit 59 into the tank 22 of the desiccating or drying apparatus. The drums are heated to a temperature ranging from 110 degrees to 150 degrees, Fahrenheit, by hot water delivered through the conduit 18, the warm air is delivered into engagement with the under surfaces of the drums through the conduit 57. The milk is delivered in a very thin film and is permitted to remain on the surfaces of the drums to be thoroughly dried and hardened during a plurality of revolutions of said drums. The milk becomes transformed into a hard coating, which when scraped off by the sharp scraper 52, a suitable brush, or other mechanism, produces a white finely sub-divided powder. This powder is brushed along the trough by the brush 50 upon the return movement of the scraper, and is delivered through the conduit 54 to a suitable screen 60. This screen is adapted to be oscillated by a suitable link 61, a bell crank lever 62, and a link 63, connected to an eccentric 64 which is operated by a belt 65 passing over a pulley 66 upon the end of the shaft to one of the drums. The fine milk powder after having passed through the screen 60 is delivered through a conduit 67 to any suitable receiver 68 in the packing room. The air in this room is preferably sterilized, and the milk powder is packed as quickly as possible in airtight receptacles. The conduit 67 is surrounded by a steam jacket 69, whereby the milk powder is heated to sufficiently high temperature to thoroughly sterilize the same.

In my improved apparatus the milk is almost instantaneously evaporated after being delivered to the surfaces of the drums, but is evaporated at a temperature below the boiling point of water or milk. If too high a temperature is employed, the albumens may coagulate, the caseins be chemically transformed, and various other changes brought about which would render the milk product insoluble or partially insoluble in water; but by thoroughly evaporating the milk to a thoroughly and completely dry state while at a temperature ranging from 110 degrees to 150 degrees, Fahrenheit, no chemical changes are brought about in the milk which would interfere in any way with the free solubility of the latter. It is entirely unnecessary to add sugar, a preservative, or any other substance to the milk before treating the same, and the resulting product, therefore, consists of merely the solids of the milk in such a form as to be freely soluble in water, and when dissolved to form a product exactly similar to fresh milk. The milk is thoroughly sterilized as soon as it leaves the desiccating apparatus and is then immediately packed in airtight receptacles, before any oxidation, decomposition, or other chemical changes take place.

Having thus described my invention, I claim as new and desire to secure by Letters Patent:

1. In combination, an interiorly-heated drum rotatable about a horizontal axis, a sprayer delivering to the outer surface thereof, and means for moving said sprayer back and forth longitudinally of the drum.

2. In combination, an interiorly-heated drum rotatable about a horizontal axis, a supply tank, a sprayer connected thereto and delivering to the outer surface of the drum, and means for moving said supply tank and sprayer back and forth longitudinally of the drum.

3. In combination, a drum rotatable about a horizontal axis, a track above said drum, a supply tank movable longitudinally of the drum along said track, a sprayer connected to said tank and delivering to the exterior of said drum and means for varying the temperature of the material on said drum.

4. In combination, a rotatable drum, a track substantially parallel to the axis of rotation of the drum, a tank movable along said track, a sprayer connected to said tank and delivering against the surface of the drum and means for varying the temperature of the material on said drum.

5. In combination, an interiorly-heated rotatable drum, a supply tank, means for moving said supply tank back and forth longitudinally of the drum, and a sprayer carried by said supply tank and delivering to the exterior of the drum.

6. In combination, two rotatable drums having rolling contact with each other, a sprayer for delivering to the exterior of said drums adjacent the line of contact, and means for moving said sprayer back and forth longitudinally of the drums.

7. In combination, two rotatable drums having rolling contact with each other, a sprayer for delivering a fluid to the surfaces of said drums adjacent the line of contact, means for moving said sprayer longitudinally of said drums, a valve controlling said sprayer, means at one end of said drums for opening the valve, and means at the opposite end of the drums for closing the valve.

8. In combination, two drums rotatable in contact with each other and about substantially horizontally-disposed axes, a track above said drums, a tank movable along said track, and a sprayer connected to said tank and delivering to the surface of said drums adjacent the line of contact.

9. In combination, two drums rotatable about substantially parallel axes and in rolling contact with each other, means for rotating said drums to move their contacting surfaces upwardly; means for varying the temperature of said drums, and means for delivering a fluid to the upper surfaces of said drums adjacent the line of contact and upon the portions rolling away from each other.

10. In combination, two substantially parallel drums in rolling engagement with each other, a sprayer for delivering a fluid to the surfaces of said drums adjacent the line of contact, means for moving said sprayer longitudinally of the drums, a valve for controlling said sprayer, means for opening said valve adjacent one end of the drums, and means for closing said valve adjacent the opposite end of the drums.

11. In combination, a rotatable drum, a sprayer movable back and forth longitudinally of the drum, means for varying the temperature of said drum and means whereby the supply of liquid to said drum is automatically shut off while the sprayer moves in one direction.

12. In combination, a rotatable drum, means for varying the temperature thereof a sprayer adapted to deliver a fluid against the surface of said drum, means for moving said sprayer back and forth longitudinally of the drum, a valve controlling the flow of fluid to said sprayer, and means whereby said valve is opened while the sprayer moves in one direction and is closed while the sprayer moves in the opposite direction.

13. In combination, a rotatable drum, means for varying the temperature thereof a supply tank adjacent said drum and movable longitudinally thereof, and a sprayer carried by said tank and adapted to deliver a fluid against the surface of said drum.

14. In combination, a rotatable drum, a track mounted above the same, a supply tank movable along said track and longitudinally of the drum, and a sprayer in communication with said tank and adapted to deliver a fluid against the surface of said drum.

15. In combination, a rotatable drum, a sprayer mounted adjacent said drum and adapted to deliver a fluid against the surface thereof, means for simultaneously rotating said drum and moving said sprayer longitudinally of the drum, a valve controlling the flow of fluid to said sprayer, means adjacent one end of the drum for opening said valve, and means adjacent the opposite end of the drum for closing said valve, whereby the sprayer delivers to the surface of said drum only while traveling in one direction.

16. In combination, a rotatable drum, a sprayer movable longitudinally of the drum and adapted to deliver a fluid against the surface thereof, a scraper in engagement with the surface of the drum and movable longitudinally thereof and means for moving said sprayer and said scraper simultaneously.

17. In combination, a drum, a sprayer movable back and forth longitudinally thereof and adapted to deliver a fluid against the surface thereof, a scraper movable longitudinally of said drum and adapted to engage therewith, and means for simultaneously rotating said drum and moving said sprayer and scraper longitudinally of said drum and in the same direction.

18. In combination, a rotatable drum, a scraper movable back and forth longitudinally of said drum, and means for holding said scraper in engagement with said drum while moving in one direction and out of engagement with said drum while moving in the opposite direction.

19. In combination, a rotatable drum, a scraper movable back and forth longitudinally of said drum, means for holding said scraper in engagement with the drum while traveling in one direction and out of engagement while traveling in the opposite direction, and means for delivering a fluid against the surface of said drum while the scraper is in engagement therewith.

20. In combination, a rotatable drum, a sprayer movable longitudinally of the drum and adapted to deliver a fluid against the surface of said drum, means whereby said sprayer is closed while moving in one direction and opened while moving in the opposite direction, a scraper movable longitudinally of the drum, and means for holding said scraper in engagement with the drum while moving in one direction and out of engagement with the drum while moving in the opposite direction, said sprayer and scraper adapted to operate simultaneously and said scraper traveling in advance of said drum.

21. In combination, a rotatable drum, a scraper movable longitudinally of said drum, a horizontally disposed trough adapted to receive the material scraped from said drum, and a brush movable longitudinally of said trough to remove the scrapings therefrom.

22. In combination, a rotatable drum, a scraper movable back and forth longitudinally thereof, a trough adapted to receive the material removed by said scraper, and means movable longitudinally of said trough and adapted to engage therewith while traveling in one direction only to convey the material in said trough to one end thereof.

23. In combination, a rotatable drum, a scraper movable longitudinally of said drum, a trough adapted to receive the scrapings, a brush movable longitudinally of said trough, and means for holding said brush out of engagement with said trough while moving in one direction, and in engagement with the trough to remove the scrapings when traveling in the opposite direction.

24. In combination, a rotatable drum, a scraper movable back and forth longitudinally of said drum, means for holding said scraper in engagement with said drum while moving in one direction and out of engagement therewith while moving in the opposite direction, a trough adapted to receive the scrapings, and means movable back and forth longitudinally of said drum and adapted to engage with the trough while moving in one direction and be held out of engagement therewith while moving in the opposite direction.

25. In combination, a rotatable drum, a plate movable back and forth longitudinally of said drum, a scraper carried by said plate and adapted to engage with the surface of said drum, a trough adapted to receive the scrapings, a brush carried by said plate and movable longitudinally of said trough, and means for holding the scraper in engagement with the drum and the brush out of engagement with the trough while the plate moves in one direction and for holding the scraper out of engagement with the drum and brush in engagement with the trough while the plate moves in the opposite direction.

26. In combination, a rotatable drum, a sprayer adapted to deliver a liquid against the surface thereof, means contacting therewith for pressing the material against said surface, and a scraper adapted to remove the material therefrom after it has remained on the surface during a plurality of revolutions of the drum and been pressed thereon a plurality of times.

27. In combination, a rotatable drum, a sprayer for delivering a liquid into engagement with the surface thereof, means contacting therewith for pressing the material against said surface, means for delivering a current of warm air against said surface, and means for scraping the material from said surface after it has remained thereon during a plurality of revolutions of the drum and been pressed thereon a plurality of times.

28. In combination, a rotatable drum, a sprayer for delivering a liquid into engagement with the surface thereof a scraper for removing the material from said surface, and means for moving said sprayer and scraper lengthwise of said drum, said scraper being in advance of said sprayer.

29. In combination, a rotatable drum, a sprayer for delivering a liquid into engagement with the surface thereof and movable longitudinally of the drum, a scraper for removing the material from said surface and movable longitudinally of the drum, and means for moving said sprayer and scraper in operative positions in one direction, with said scraper in advance of said sprayer, and returning said sprayer and scraper in inoperative position to the opposite end of the drum.

In testimony whereof I have signed my name to this specification in the presence of two subscribing witnesses.

JOHN ROEH.

Witnesses:
  A. G. GRAY,
  E. D. KING.